(No Model.)
S. A. CLOUD.
CAR COUPLING.
No. 459,994.   Patented Sept. 22, 1891.
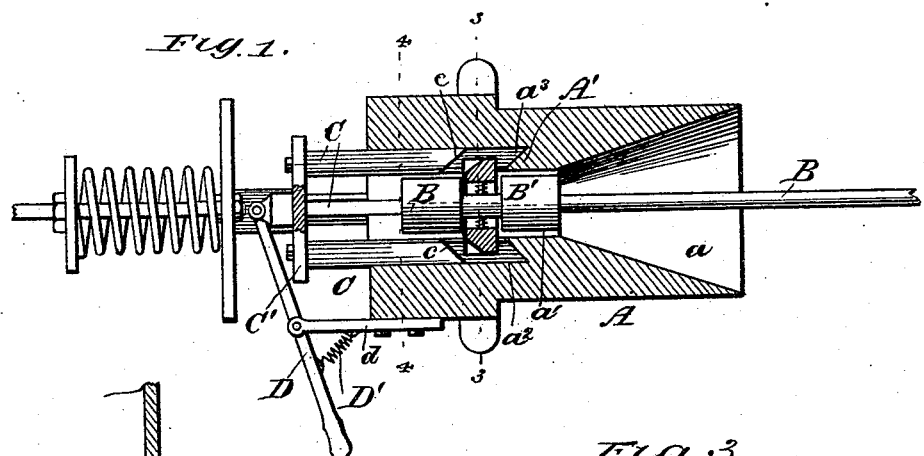
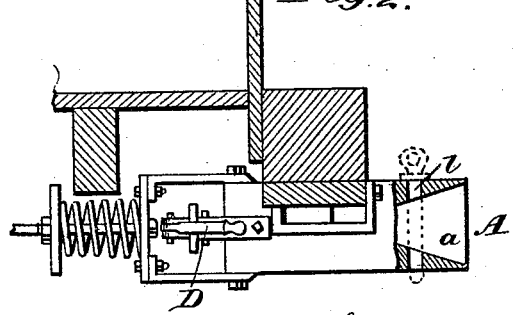
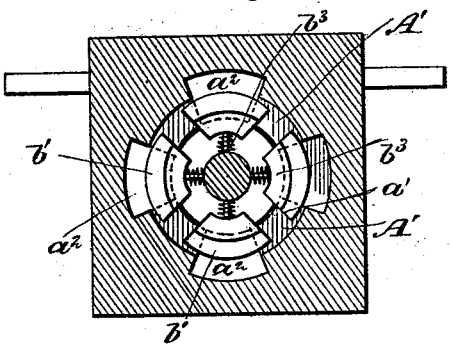
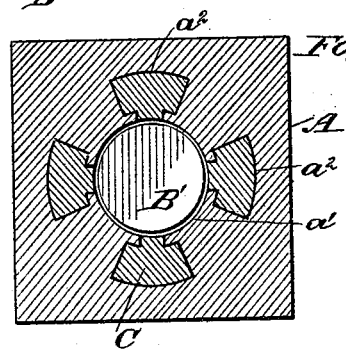
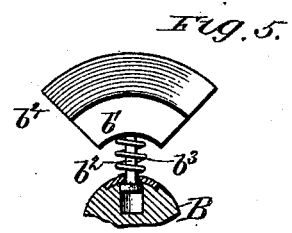
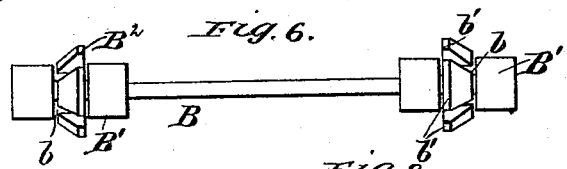
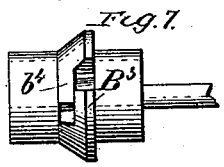
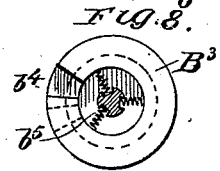
WITNESSES:   INVENTOR:
   S. A. Cloud
BY
ATTORNEYS

UNITED STATES PATENT OFFICE.

SAMUEL A. CLOUD, OF LENNI, PENNSYLVANIA.

CAR-COUPLING.

SPECIFICATION forming part of Letters Patent No. 459,994, dated September 22, 1891.

Application filed May 29, 1891. Serial No. 394,508. (No model.)

*To all whom it may concern:*

Be it known that I, SAMUEL A. CLOUD, of Lenni, in the county of Delaware and State of Pennsylvania, have invented a new and Improved Car-Coupling, of which the following is a full, clear, and exact description.

The object of the invention is to provide an automatic car-coupling, simple in construction and effective in operation.

The invention consists in the novel construction and combination of parts, as hereinafter particularly described, and defined in the claims.

Reference is to be had to the accompanying drawings, forming a part of this specification, in which similar letters of reference indicate corresponding parts in all the figures.

Figure 1 is a horizontal sectional view illustrating my new and improved car-coupling. Fig. 2 is a partly sectional side elevation with the coupling-link omitted. Fig. 3 is a cross-section on line 3 3, Fig. 1. Fig. 4 is a cross-section on line 4 4, Fig. 1. Fig. 5 is an enlarged detail view of a portion of the expansible coupling-ring. Fig. 6 is a plan view of the coupling-link detached, and Figs. 7 and 8 illustrate a slight modification.

The draw-head has a flaring mouth $a$ for the entrance of the end of the coupling-link B. The flaring mouth $a$ terminates at its inner end in a cylindrical bore $a'$, with which there communicate dovetail recesses $a^2$, arranged radially around said bore and forming shoulders or abutments A′ within the draw-head. The coupling-link B is provided at each end with a cylindrical head B′, in which is formed an annular groove $b$, and in the said grooves an expansible ring B² is arranged, the same consisting of the segments $b'$, which are movable on the guide-studs $b^2$, that project radially from the link B. Spiral springs $b^3$ surround the studs $b^2$ and serve to normally project the segments $b'$ beyond the plane of the cylindrical head B′.

The radial recesses $a^2$ extend to the back end of the draw-head A, and in said grooves there is fitted to slide the push-bars C, which are supported from a head C′, said head being actuated by a lever D, which is pivoted at one end to the head C′ and fulcrumed on a bar $d$ or other support. A spring D′ serves to return the lever D to its normal position.

The inner ends of the push-bars C are beveled, as at $c$, as are also the opposed edges of the spring-supported segments $b'$, as indicated at $b^4$. The forward walls $a^3$ of the recesses $a^2$ are similarly beveled.

With this construction as the head B′ enters the draw-head A the segments forming the ring B² will be forced within the plane of the cylindrical head B′, and will thus enter the cylindrical bore $a'$ of the draw-head, where they are forced outward by their springs $b^3$ to engage the shoulders A′ and couple the cars.

When it is desired to uncouple the cars, it is only necessary to throw the lever D, which will move the push-bars C inward against the segments $b'$, and the contacting beveled edges $c$ $b^4$ will cause the said segments to move within the plane of the cylindrical head B′ and permit the coupling-pin to withdraw.

For coupling to a car having the ordinary link-and-pin coupling the draw-head is provided with a vertical passage $l$ for receiving the ordinary pin E.

It will be seen that the invention provides a simple and efficient coupling by which the coupling may be affected automatically and without the danger incident to ordinary couplings.

In practice the draw-head may be of any suitable external contour, and the proportions and details of the parts will be such as experience may prove most practical.

The expansible ring may be made in one piece, as shown in Figs. 7 and 8. In this case the ring B³ is formed with rabbeted overlapping meeting ends $b^4$, and is supported by springs $b^5$. Either form may be employed, as may be found most serviceable in practice.

Having thus described my invention, what I claim as new, and desire to secure by Letters Patent, is—

1. In a car-coupling, the combination of a coupling-link having annularly-grooved cylindrical heads, spring-supported segments arranged in said annular grooves, a draw-head having internal shoulders for engaging said segments, and pusher-bars movable against said segments for forcing them into the grooves of the coupling-link for disengaging the latter, substantially as described.

2. In a car-coupling, a coupling-link having spring-supported segments at its ends, provided with beveled edges, in combination with a draw-head having internal shoulders for engaging said segments, pusher-bars movable in said draw-head and having their ends beveled for contacting with the correspondingly-beveled segments, the said bars being carried by a head, and a lever for throwing said head to actuate the pusher-bars, substantially as described.

SAMUEL A. CLOUD.

Witnesses:
 JAS. W. SHIMM,
 J. ALFRED HOWARD.